(12) United States Patent
May

(10) Patent No.: US 8,016,198 B2
(45) Date of Patent: Sep. 13, 2011

(54) ALIGNMENT AND NON-ALIGNMENT ASSIST IMAGES

(75) Inventor: Gregory J. May, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 156 days.

(21) Appl. No.: 11/869,744

(22) Filed: Oct. 9, 2007

(65) Prior Publication Data

US 2009/0090782 A1    Apr. 9, 2009

(51) Int. Cl.
G06K 7/10    (2006.01)
G06K 7/14    (2006.01)

(52) U.S. Cl. ............... 235/462.2; 235/454; 235/462.21

(58) Field of Classification Search ............ 235/454, 235/462.08, 462.09, 462.17, 462.2, 462.32, 235/470, 462.21, 462.14; 382/321; 353/28, 353/30, 36, 69, 122; 250/557; 356/399, 356/400; 355/55; 348/70, 94, 61, 62, 211.99
See application file for complete search history.

(56) References Cited

U.S. PATENT DOCUMENTS

| | | | |
|---|---|---|---|
| 4,766,299 A | | 8/1988 | Tierney et al. |
| 5,019,699 A | | 5/1991 | Koenck |
| 5,191,411 A | * | 3/1993 | Muckerheide ............... 348/61 |
| 5,296,689 A | | 3/1994 | Reddersen et al. |
| 5,331,176 A | | 7/1994 | Sant Anselmo et al. |
| 5,378,883 A | | 1/1995 | Batterman et al. |
| 6,060,722 A | | 5/2000 | Havens et al. |
| 6,223,986 B1 | * | 5/2001 | Bobba et al. ............... 235/462.2 |
| 6,561,428 B2 | * | 5/2003 | Meier et al. ............. 235/462.25 |
| 6,798,401 B2 | * | 9/2004 | DuFaux ..................... 345/168 |
| 6,840,627 B2 | * | 1/2005 | Olbrich ........................ 353/42 |
| 6,866,198 B2 | | 3/2005 | Patel et al. |
| 6,877,664 B1 | | 4/2005 | Oliva |
| 6,970,600 B2 | * | 11/2005 | Abe ........................... 382/187 |
| 6,997,385 B2 | * | 2/2006 | Palestini et al. ............. 235/454 |
| 7,090,137 B1 | * | 8/2006 | Bennett .................. 235/472.01 |
| 7,163,150 B2 | | 1/2007 | Kricorissian et al. |
| 7,240,842 B2 | | 7/2007 | Hara et al. |
| 7,392,951 B2 | * | 7/2008 | Ray et al. ................. 235/462.2 |
| 2001/0041073 A1 | * | 11/2001 | Sorek et al. ................. 396/431 |
| 2005/0279832 A1 | * | 12/2005 | Kobayashi et al. ...... 235/462.07 |
| 2006/0033884 A1 | * | 2/2006 | Sato ............................ 353/30 |
| 2006/0043191 A1 | | 3/2006 | Patel et al. |
| 2007/0108283 A1 | | 5/2007 | Thuries |

* cited by examiner

*Primary Examiner* — Daniel A Hess
*Assistant Examiner* — Matthew Mikels

(57) ABSTRACT

Various apparatus and methods relating to the use of alignment assist images and non-alignment assist images for capturing images of one or more targets are disclosed.

18 Claims, 4 Drawing Sheets

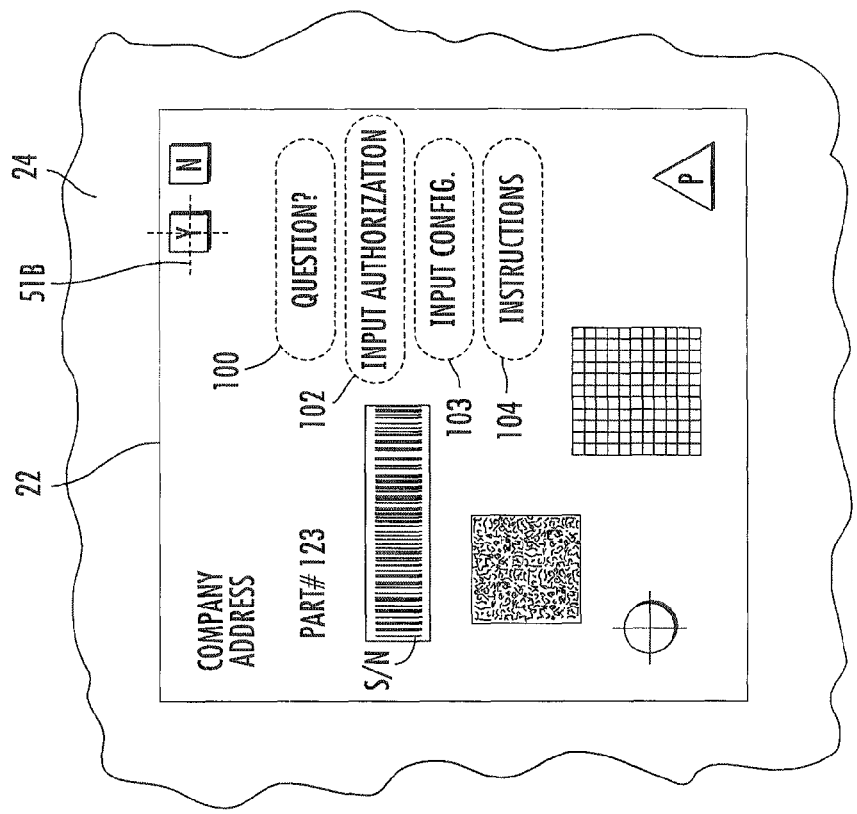
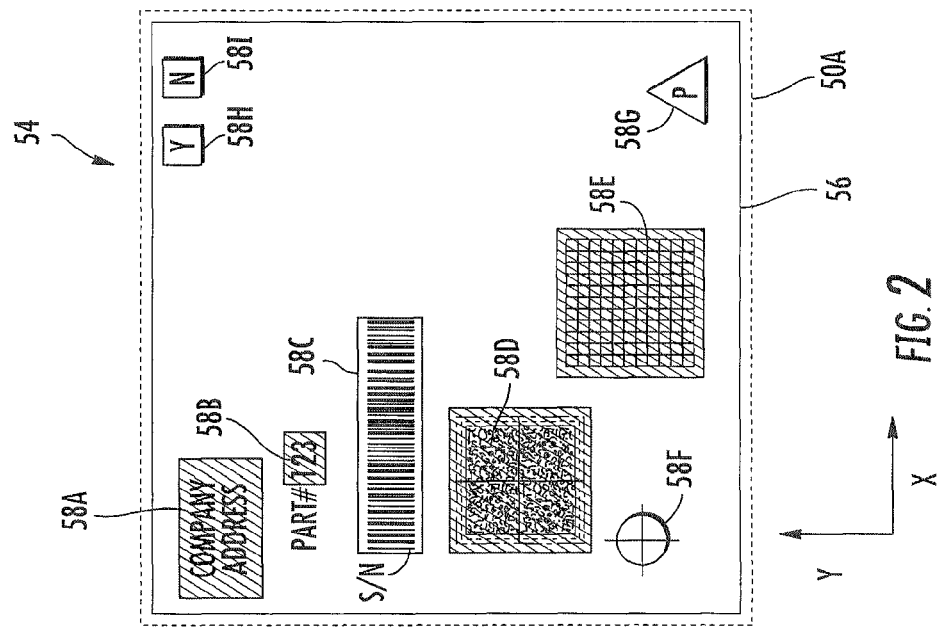

ALIGNMENT AND NON-ALIGNMENT ASSIST IMAGES

BACKGROUND

Imaging systems and devices, such as scanners, capture images of targets for storage, decoding and/or subsequent use. Capturing images of multiple targets may be time-consuming and tedious. Providing such imaging devices with displays or multiple user inputs may increase the cost and complexity of the imaging devices.

BRIEF DESCRIPTION OF THE DRAWINGS

FIG. 2 is a top plan view of a captured image of the surface of FIG. 1 according to an example embodiment.

FIG. 3 is a schematic illustration of another set of alignment assist images and non-alignment assist images projected onto the surface according to an example embodiment.

DETAILED DESCRIPTION OF THE EXAMPLE EMBODIMENTS

Figure 1:
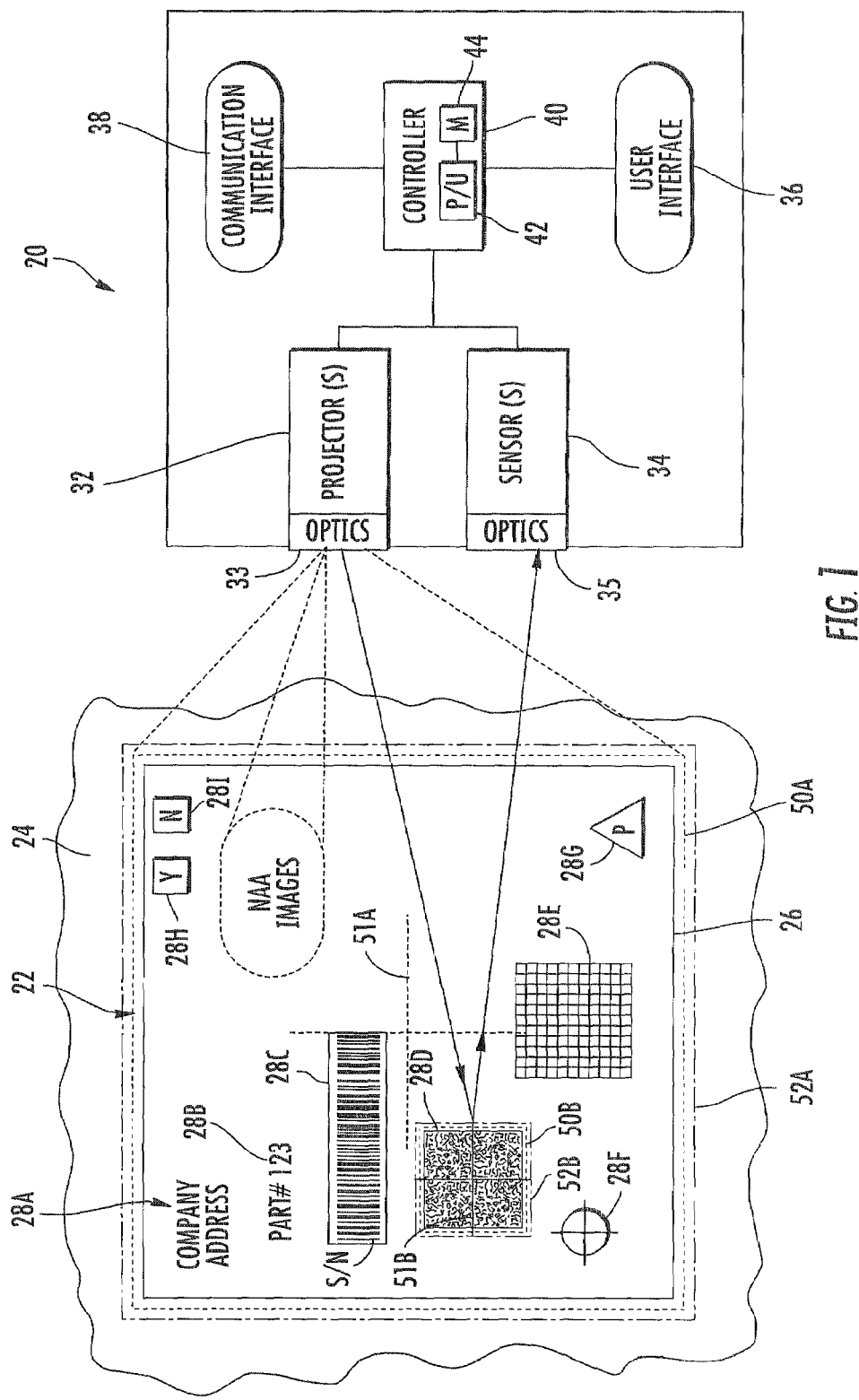
FIG. 1 is a schematic illustration of an imaging system projecting a set of alignment assist images and non-alignment assist images onto a surface according to an example embodiment.

FIG. 1 schematically illustrates imaging system 20 according to an example embodiment. As will be described hereafter, imaging system 20 facilitates capturing of images of the multiple targets in less time and a less tedious fashion. Imaging system 20 also communicates with a reduced reliance upon displays or user inputs to reduce the cost and complexity of system 20.

FIG. 1 schematically illustrates imaging system 20 interacting with a label 22. Label 22 is provided upon a surface 24. In one embodiment, label 22 may comprise a distinct sheet or structure secured to surface 24. For example, label 22 may comprise a sticker adhesively bound to surface 24. In another embodiment, label 22 may be taped to surface 24. In yet another embodiment, label 22 may be printed, stamped or otherwise formed directly upon the surface 24.

Label 22 has a border 26 and multiple distinct potential targets 28A-28I (collectively referred to as targets 28). Border 26 surrounds targets 28 and serves as a detectable perimeter. In one embodiment, border 26 may be a continuous or discontinuous line about targets 28. In another embodiment, border 26 may comprise a change in surface characteristics such as a change in color, texture or sheen (glossiness or reflectivity). For example, label 22 may have a first color or texture while the surrounding surface 24 has a distinct color, texture or sheen. In one embodiment, border 26 has a known or predetermined relative position with respect to each of targets 28. In one embodiment, this known position relative to each of targets 28 is stored in a memory associated with system 20. As will be described hereafter, in particular embodiments, border 26 facilitates alignment of a field-of-vision or view of system 20 to capture images of targets 28. In yet other embodiments, border 26 may be omitted.

Targets 28 comprise images including text or graphics. Targets 28 may have a variety of sizes, shapes and purposes. In the example illustrated, targets 28A and 28B comprise one or more alphanumeric symbols or characters. In the example illustrated, target 28A comprises an address (schematically represented). Examples of target 28A include an address such as a shipping address identifying a recipient or identifying a sender. Target 28B comprises a part number.

Targets 28C-28E are examples of graphics of codified data. Target 28D is a two-dimensional barcode. Target 28E is a three-dimensional barcode. The codified data may be represented by distinct patterns of dark and light portions or distinct patterns of distinct colors. Examples of such graphics of codified data include, but are not limited to, a Maxi code, bar code, Universal Product Code (UPC) and the like. Graphics of codified data may have other forms as well.

Targets 28F and 28G are examples of orientation and location indicators. Such indicators have known or predetermined positions or locations relative to one or more of the other targets 28. Targets 28F and 28G are configured to be read (i.e. have their images captured) or recognized by system 20 and to be used by system 20 to determine an orientation of label 22 with respect to system 20, a distance of system 22 with respect system 20 and/or relative positions of targets 28 with respect to system 20. Although target 28F is illustrated as having a crosshair and target 28G is illustrated as having an alphanumeric symbol, "P" surrounded by a triangle, targets 28F and 28G may have a variety of other configurations that also permit imaging system 20 to determine an orientation of label 22 with respect to system 20, a distance of system 22 with respect system 20 and/or relative positions of targets 28 with respect to system 20. In other embodiments, one or both of targets 28F and 28G may be omitted.

Targets 28H and 28I are examples of input or response selections that may be read or captured by imaging system 20. Targets 28H and 28I facilitate input of information by a user to system 20 without using manual or audible inputs (push-buttons, slides, microphones, touch screens, touch pads and the like). In the example illustrated, target 28H represents a positive or affirmative response such as "yes" while target 28I represents a negative response such as "no". As will be described hereafter, in response to an inquiry, question or other input request, a person may locate imaging system 20 so as to read either target 28H or 28I to answer the inquiry or input request. In the example illustrated, imaging system 20 uses optical character recognition (OCR) to identify the response or answer of the user. In other embodiments, targets 28H and 28I may comprise other input or response selections. For example, in other embodiments, label 22 may be provided with a series of numbers or words from which a user may choose or cause system 20 to sequentially read, facilitating input of information to system 20. In other embodiments, such input selections may comprise graphics of codified data or may comprise images, pictures or photos representing selections or data that may be chosen for responding to inquiries from system 20. In yet another embodiment, targets 28H and 28I may be omitted.

Imaging system 20 interacts with label 22 by reading or capturing an electronic image of one or more of targets 28. Imaging system 20 uses the captured images by performing such activities as storing the captured images, transmitting the captured images to other electronic devices, decoding the captured images, inserting the captured images into other electronic files or applications or using the captured images in other electronic files or applications. In some embodiments, imaging system 20 may further be configured to print the captured image or to print other data based upon the captured image. In the example illustrated, imaging system 20 includes one or more projectors 32, one or more sensors 34, user interface 36, communication interface 38 and controller 40.

Projectors 32 comprise one or more projector devices configured to project electromagnetic radiation onto surface 24 or another surface. For purposes of this disclosure, the term "projector" comprises any device configured to project electromagnetic radiation onto a surface. The electromagnetic radiation (EMR) projected by projectors 32: (1) is reflected off of one or more of targets 28, wherein the reflected EMR is sensed by sensors 34 to facilitate the capturing of an image of one or more of targets 28 and/or (2) interacts with surface 24, label 22 or another surface so as to form one or more images visible to the human eye. In one embodiment, projectors 32 are configured to project visible light (visible to the human eye) onto surface 24. In one embodiment, projectors 32 may include a holographic projector, a laser projector or a light emitting diode (LED) projector, slide projection or any device or system capable of projecting a symbol or image onto a surface. In other embodiments, projectors 32 may additionally or alternatively be configured to project other forms of electromagnetic radiation such as ultraviolet or infrared light. For example, in one embodiment, surface 24, label 22 or another surface may be configured to interact with the ultraviolet and infrared light so as to emit or reflect light visible to the human eye upon being irradiated with the pattern or image of ultraviolet or infrared light. For example, surface 24, label 22 or the other surface may include phosphors which, upon being excited with ultraviolet light, emit visible light to form an image viewable by a human eye.

In one embodiment, projectors 32 may include (1) a first projector configured to project or direct EMR at one or more of targets 28 such that the reflected EMR is detected by sensors 34 and (2) a second projector configured to form an image upon surface 24, label 22 or another surface for communicating with a user. In one embodiment, the first projector and the second projector may be substantially identical to one another but for their different functions. In another embodiment, the first projector and the second projector may comprise distinct types of projectors, enabling each projector type to be selected based upon its noted function. In one embodiment, the first projector and the second projector may both comprise an LED projector. Because projectors 32 comprise two distinct projectors, the image of the one or more targets 28 captured by sensors 34 using the EMR projected by the first projector may include the image formed from the EMR projected by the second projector. In another embodiment, the same one or more projectors may be utilized to perform both functions: providing EMR that is reflected in sensed by sensors 34 and providing EMR forms a visible image for communicating with the user, reducing cost and complexity. In other embodiments, projectors 32 may include the first projector that communicates with a user while omitting the second projector that merely provides EMR for sensors 34 such as when sensors 34 instead utilize ambient light or other available light for capturing or detecting data upon label 22.

As shown by FIG. 1, in one embodiment, projectors 32 may additionally include optics 33. Optics 33 may comprise one or more lenses configured to direct or focus light or EMR provided by projectors 32. In one embodiment, such lenses may be adjustable or movable become either manually or by one or more powered actuators in response to control signal from controller 40. In yet another embodiment, optics 33 may be omitted.

Sensors 34 comprise one or more sensing devices configured to sense or detect EMR reflected or emitted from one or more portions of label 22. In one embodiment, sensors 34 comprise one or more charge coupled devices (CCDs). In other embodiment, sensors 34 may comprise other EMR detectors. In one embodiment which system 20 comprises a CCD scanner, sensor 34 may comprise a two-dimensional array of EMR detection elements. In another embodiment in which system 20 comprises a laser scanner, sensor 34 may comprise a single EMR detection element or a number of EMR detection elements that detect EMR as the laser is rastered or scanned across label 22.

As further shown by FIG. 1, in one embodiment, sensors 34 may additionally include optics 35. Optics 35 may comprise one or more lenses configured to direct or focus reflected light or reflected EMR from label 22. In one embodiment, such lenses may be adjustable or movable become either manually or by one or more powered actuators in response to control signal from controller 40. In yet another embodiment, optics 35 may be omitted. Although projectors 32 and sensors 34 are illustrated as utilizing distinct optics 33, 35, in other embodiments, one or more projectors 32 and one or more sensors 34 may share or use the same set of optics.

User interface 36 comprises one or more devices or components configured to facilitate communication between system 20 and a person using imaging system 20 and/or the input of commands or data by a person using imaging system 20. Examples of such devices or components include, but are not limited to, push buttons, pivoting triggers, toggles, switches, slide bars, touch pads, touch screens, display screens, auditory speakers, auditory microphones, a mouse, key boards, key pads and the like. As noted above, the particular embodiment imaging system 20 may lessen use or reliance upon user interface 36. In some embodiments, user interface 36 may be omitted.

Communication interface 38 comprises a component of system 20 configured to communicate with external electronic devices. Communication interface 38 is configured to transmit data as well to receive data. In one embodiment, communication interface 38 is configured to communicate wirelessly with external electronic devices. For example, in one embodiment, communication interface 38 may communicate with radio waves such as with a wireless IEEE 802.11g module. In other embodiments, communication interface 38 may communicate with ultraviolet or infrared light. In still other embodiments, communication interface 38 may be a wired connection, wherein communication occurs through electrical or optical cables. For example, in one embodiment, communication interface 38 may comprise a Universal Serial Bus (USB) port.

Controller 40 comprises one or more processing units 42 and one or more associated memories 44. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 40 may be embodied as part of one or more application-specific integrated circuits (ASICs). Unless otherwise specifically noted, the controller is not limited to any specific combination of hardware circuitry and software, nor to any particular source for the instructions executed by the processing unit.

Controller 40 generates control signals directing operation of projectors 32 and sensors 34. In particular embodiments, controller 40 additionally analyzes and uses the images captured by sensors 34. In the particular example illustrated, imaging system 20 is operable in distinct modes which may be selectively chosen by a person using user interface 36 or another external device via communication interface 38. In particular, imaging system 20 is operable under a first mode in which controller 40 identifies and analyzes a portion of an image captured by sensors 34 corresponding to a target based upon positioning of an alignment assist image on the surface while disregarding other portion to the image.

Imaging system 20 is also operable under a second mode in which substantially an entirety of an image captured by sensors 34 is analyzed. With such a mode, the target of interest and sensors 34 are positioned relative to one another such that the captured image largely excludes areas or targets other than the target of interest.

Imaging system 20 is further operable under a third mode in which controller 40 generates control signals directing projector(s) 32 to project at least one non-alignment assist image for facilitating communication between the user or system 20 and system 20. Imaging system 20 may operate under the third mode while also operating under either the first mode or the second mode. In other embodiments, imaging system 20 may offer additional modes as well.

When operating under the first mode, the one or more processing units 42, following instructions contained in memory 44, or another associated memory, and in response to input from user interface 36 and/or communication interface 38, generates control signals directing projectors 32 to project the EMR, such as visible light, onto surface 24, which includes label 22, to form one or more alignment assist images such as alignment assist image 50A and/or alignment assist images 51A. Throughout this disclosure, projected light is represented by dashed lines. Alignment assist images 50 and 51 comprise images projected onto surface 24, including label 22, wherein the alignment assist images 50 and 51 having a known nor predetermined position relationship to a field of view or vision of sensors 34.

The field of view or field-of-vision of sensors 34 is the area or range that may be detected by sensors 34 during a single image capture. For example, in an embodiment where sensors 34 are part of a CCD scanner or include a two-dimensional array of detection elements, the field-of-vision of sensors 34 corresponds to a two-dimensional area of surface 24 from which reflected EMR or light is concurrently received by sensors 34. In other words, the field-of-vision is the area of the snapshot or picture taken by sensors 34. In embodiment where sensors 34 are part of a laser scanner, the field-of-vision corresponds to the area or range of surface 34 that is sensed during a raster or one or more passes of a laser across surface 24. Throughout this disclosure, fields-of-vision are represented by dot dash dot lines.

In the example illustrated in FIG. 1, sensor 34 is depicted as having a field-of-vision 52A when system 20 is at a particular location. Field-of-vision 52A depicts the area of surface 22 captured by sensors 34 when sensors 34 are at a first position with respect to surface 24. As shown by FIG. 1, alignment assist image 50A and 51A correspond to field-of-vision 52A. Alignment assist images 50A and 51A substantially indicate to a user what areas or portions of surface 24 will be captured when sensors 34 is at the current position and if sensors 34 were to be actuated.

As shown by FIG. 1, alignment assist image 50A comprises a box corresponding to the rectangular fields-of-vision 52A. Such boxes may be provided by projected lines or may be provided by projected areas of light having distinct colors or patterns. Alignment assist images 51A comprises projected crosshairs which correspond to a center of the field-of-vision 52A. In other embodiments, alignment assist images 50A and 51A may have other projected image configurations, wherein the projected image has a known or predetermined positional relationship to the associated field-of-vision. For example, in one embodiment, the cross hair of alignment assist image 51A can be placed over a particular target (such as target 28G) and not necessarily in the center, wherein the alignment assist image 51A corresponds to a lower corner of the field-of-vision 52A (i.e. a certain distance and angle within the view 52A).

When operating system 20 is operating in the first mode, a person is instructed to move or locate sensors 34 of system 20 opposite label 22 of surface 24 such that the projected alignment assist image 50A, corresponding to field of view 52A, surrounds more than one target 28. In a particular example illustrated, the person using system 20 is instructed to substantially align alignment assist image 50A with border 26 of label 22. The person may additionally or alternatively be further instructed to position one or both of system 20 and label 22 such that the projected alignment assist image 51A is substantially at a center of label 22 and has a particular size (i.e. 1 inch by 1 inch). The size of the crosshair will correspond to the proportional size of the field-of-vision at which image 51A is substantially centered.

Once the alignment assist image 50A or 51A is appropriately positioned, the person is instructed to actuate sensors 34 to capture an image of an area corresponding to the field-of-vision 52A. In one embodiment, user interface 36 comprises a two position trigger switch. Depressment of the trigger switch to the first position causes controller 40 to generate control signals directing projectors 32 to project one or both of alignment assist images 50A, 51A. While holding the trigger switch in the first position, the alignment assist images are properly positioned. Once the user has properly positioned the alignment assist images, the person depresses the trigger switch to a second position causing controller 40 to generate control signals directing sensors 34 to capture the image. In one embodiment, the captured image is stored in memory 44 or another memory.

FIG. 2 illustrates an electronic file or electronic image 54 captured by sensors 34. In the particular example illustrated, during the capture of the image 54 by sensors 34, projectors 32 are also projecting alignment assist image 50A. As a result, alignment assist image 50A is also part of the captured image. In other embodiment, the projection of alignment assist image 50A may be stopped prior to capturing of the image. As shown by FIG. 2, image 54 additionally includes image portions 56 and 58A-58I corresponding to border 26 and targets 28A-28I, respectively.

As schematically represented by crosshatched areas, controller 40 identifies and analyzes portions of the captured image 54 corresponding to a target 28 based upon positioning of alignment assist image 50A on surface 24 (as seen in FIG. 1) while disregarding the remaining other portions of the captured image 58. For purposes of this disclosure, the analyzing performed by controller 40 of targets 28 includes such actions as storing the captured images, transmitting the captured images to other electronic devices, decoding the captured images, inserting the captured images into other electronic files or applications or using the captured images in other electronic files or applications.

Controller 40 uses the known or predetermined relative positioning of the alignment border 26 to each of targets 28 and the given alignment of alignment assist image 50A with border 26 to determine the locations or X-Y coordinates of image portions 58. In one embodiment in which sensors 34 comprise a CCD scanner having an array of detection elements or detection pixels which formed image 54, controller 40 identifies what particular subset of the detection pixels and what particular portion 58 of image 54 corresponds to a particular target 28 on label 22. By identifying what specific portions of image 54 correspond to particular targets 28 on label 22 (shown in FIG. 1), controller 40 is able to focus its analysis upon only a subregion or portion of image 54 to attain the desired target data while ignoring the remaining portions of image 54.

For example, should controller 40 be interested in only the data associated with target 28D, controller 40 may consult memory 44 to determine the relative position of target 28D with respect to border 26. Presuming that the perimeter of the field-of-vision 52A of sensors 34 has been aligned with border 26 by the substantial alignment of alignment assist image 50A with border 26 during the capturing an image 54, the perimeter of the field-of-vision 52A and the perimeter of captured image 54 will have the same relative positioning with respect to the desired target 28D. As a result, the relative positioning of image portion 58D, which corresponds to target 28D, with respect to the perimeter of image 54 may be determined. By determining the relative positioning or X-Y coordinates of image portion 58D, controller 40 may focus its analysis (schematically represented by a crosshatched area) on just those pixels or portions of captured image 54 that form image portion 58D while disregarding the remainder of captured image 54. In other words, rather than having to analyze or decode the entire captured image 54, controller 40 may analyze a discrete portion of image 54 to attain the desired data. Consequently, processing power and time are conserved.

In the example illustrated, controller 40 sequentially analyzes a plurality of distinct, discrete portions of image 58 corresponding to distinct targets 28 based upon positioning of the alignment assist image 50A. For example, controller 40 may analyze image portion 58D, then image portion 58A, then image portion 58E and finally image portion 58B. During the analysis of one image portion, the other image portions are disregarded. As a result, data or information from multiple targets 28 may be acquired from a single image capture or scan without a person having to reposition system 20 or sensors 34. Because the positions of those portions of the captured image 54 corresponding to the individual desire targets 28 are determined as described above (based upon predetermined relative positions from the projected AA image), the entirety of the captured image 54 need not be processed, decoded or otherwise analyzed. Rather, only those selected portions of image that correspond to the desired or selected targets are analyzed to acquire data corresponding to selected targets 28. As a result, data from multiple targets may be captured in less time and with less processing power.

In one embodiment, such sequential analysis of the plurality of distinct discrete portions of image 58 may be automatically initiated and carried out for all of the multiple targets in response to actuation of a single trigger or a single trigger event. For example, system 20 may include a hand or pivotable trigger or pushbutton trigger, wherein pivoting of the trigger or depressment of the trigger initiates analysis of each and all of the distinct targets. In another embodiment, analysis of each individual discrete portion of image 58 (each target) may be initiating carried out in response to multiple trigger events. For example, pivoting or depressment of a trigger may result in the analysis of a first portion of image 58 (a first target), pivoting or depressment of the same trigger a second time may result in analysis of a second portion of image 58 (a second target) and so on. Actuation of the trigger permits multiple targets to be captured or extracted from the frame or image captured by sensors 34 without intervening repositioning of the system 20 relative to label 22.

Thus, according to one method, an operator would first pull, push or otherwise move a trigger to first position. In response, projectors 32 project an alignment assist image. Thereafter, the operator orients the system 20 over reference target (for example, the triangle of target 28G). Next, the operator pulls the trigger to a second position. In response, sensors 32 begin capturing or scanning within the field-of-vision 52A. Controller 40 interprets each of smaller portions of the surface within the field-of-vision. In other words, the overall scan is captured and processing occurs for each of those portions in succession. Finally, projectors 32 project one or more NAA images such as "OK" NAA or can be clone after each scan.

Although system 20 has been described as utilizing the known or predetermined relative position of border 26 with respect to targets 28 and the alignment of alignment assist image 50A with the border 26 to subsequently determined the positioning of each of targets 28 within the field-of-vision 52A and the corresponding captured image 54, in other embodiments, the position of targets 28 in the captured image 54 may be determined in other fashions. For example, instead of using the relative position between border 26 and targets 28, the relative position between targets 28F or 28G may alternatively be used. In particular, each of targets 28F and 28G has a known relative position to targets 28. Using such targets, a person locates alignment assist image 50A about such individual targets or substantially centers alignment assist image 51A on the target or a particular portion of one of such targets. This allows the ability to determine the sense of proper scale. By sizing the target projection by moving the scanner forward or back to circle the target, then one has established a "scale" so any predetermined location for auto scanning within the box will be scaled properly. Because the alignment assist image 50A or 51A has a known or predetermined relationship to the field-of-vision of sensors 34 (and the borders of the subsequently captured image 54) and because target 28F or target 28G have a known or predetermined position relative to each of targets 28 (as stored in memory 44), controller 40 may determine the relative positions of targets 28 with respect to the borders of the captured image 54, enabling controller 40 to analyze discrete portions of the captured image without analyzing the entirety of the captured image to obtain data for a particular desired one of many targets in the captured image.

When operating under the second mode, processing units 42 of controller 40 following instructions contained in memory 44 of controller 40 generates control signals directing projectors 32 to project alignment assist images onto label 22 to identify to a person a field-of-vision of sensors 34 at the current relative positioning of sensors 34 and label 22. In the example illustrated, projectors 32 are illustrated as projecting alignment assist images 50B and 51B. Alignment assist images 50B and 51B are similar to alignment assist images 50A and 50B, respectively, except that such alignment assist images demarcate a smaller field-of-vision 52B which substantially contains only a portion of label 22 and largely a single target of interest. (Optics 33, 35 may or may not be correspondingly adjusted to aid in resolving for the sensor.) In the example illustrated, system 20 and label 22 are positioned relative to one another such that the field-of-vision 52B merely circumscribes or surrounds target 28D. As a result, the captured image will largely include a portion of label 22, namely, target 28D.

To capture images of other targets 28, a user of system 20 repositions sensors 34 and label 22 relative to one another such that the projected alignment assist image 50B surrounds the other target 28 of interest or such that the crosshairs of image 51B are centered upon the other target 28. In those circumstances where the field-of-vision of sensors 34 captures portions of targets other than the target of interest, controller 40 may analyze the entire field-of-vision or captured image to identify the target data and to disregard or not use the data or portions of data from those additional target portions that were partially within the field-of-vision of sensors 34. Although alignment assist images that directly relate to a target image (surrounding the target image) are illustrated, in other embodiments, such alignment assist images may not be directly related to the location of the target imaging (not necessarily surround the image) but may still be related by relative positioning (distance and angle).

FIG. 1 further illustrates system 20 operating under the third mode in which projectors 32 project one or more non-alignment assist (NAA) images onto label 22, portions of surface 24 outside label 22 or upon other surfaces to communicate with the person using system 20. As for the shown by FIG. 1, system 20 may concurrently operate under the third mode and either of the first mode or the second mode such that the NAA images are projected along with the projection of alignment assist images 50A and/or 50B or along with the projection of alignment assist images 50B and/or 51B. In one embodiment, the NAA images may be projected during the capture of the image by sensors 34. In another embodiment, the projection of the NAA images may cease during the capture of images by sensors 34.

For purposes of this disclosure, the term "non-alignment assist image" or "NAA image" shall mean any image projected by the one or more projectors 32 onto any surface external to system 20 that is visible to the human eye upon the surface and that itself does not demarcate or identify the field-of-vision of the one or more sensors 34. For example, a NAA image would not include images 50A, 51A, 50B or 51 B as they demarcate or identify either the perimeter or a center of their associated fields-of-vision. NAA images facilitate communication with a person using system 20 to reduce or eliminate reliance upon user interfaces such as display screens, keyboards, touchpads and the like.

Examples of NAA images include, but are not limited to: (1) a target type request—text or graphics identifying or requesting that the person using system 20 locate the field-of-vision of sensors 34 over a particular type of target (for example, a serial number, a particular bar code, a particular address or other target); (2)a scanned completion status—a status of a particular scan (for example, "completed", "ok", "started", "initiated", "in process", a projected graphic of a clock, a projected graphic of an hourglass);(3) a scanning error message or other notification; (4) an input request (for example, a request for the input of selections to configure system 20, requests for information to establish or set settings for system 20, a request for identification of a file or other memory location at which the captured target or data from the captured target are to be stored, a request for identification of recipient where the target data is to be transmitted, a request for an authorization code or other authorization information, a request for information regarding the number of targets to be analyzed from a particular captured image such as when system 20 is operating under the first mode, and/or a request for an identification of the particular type of label 22 being scanned or the type or number of targets upon label 22; a request for a menu selection for the scanning device, much like television remote, or generic display of menu); (5) a question; (6) a message indicator (for example, a notification at an external communication has been received via communication interface 38 or that a message has been sent or is awaiting to be sent); (7) an overall system or subsystem status (for example, a projection indicating battery life remaining, pen health, display of running user metrics, scan rates/hr, etc. # of had scans, ratio of good to back scans); (8) a source identifier (for example, a local, trademark and a light identifying the source or suppliers system 20 or other entities or sources relating to information on the label 22 or articles or products associated with label 22); (9) a representation or matrix of an electronic form to be at least partially completed based upon data procured from scanned targets; and (10) a graphical representation of a particular target that an alignment assist image such as 50B or 51B should be positioned over or about to help user identified the particular target that should be captured by sensors 34.

NAA images may comprise alphanumeric symbols or characters such as single letters or numbers, or words. NAA images may comprise graphics, pictures, icons and the like. NAA images may comprise stationary images (seen as stationary by the human eye) or may comprise images in motion. For example, particular NAA images may rotate or move across the surface onto which they are being projected. For example, to indicate the status of a scan or the initialization of system 20 prior to scanning, projectors 32 may project a rotating hourglass or hourglass illustrating movement of sand. To illustrate completion status of a scan, projectors 32 may project a bar, circle or other graphic which is completed or which is filled as the scanning or other process is completed, wherein the percentage of completion of the graphic or filling of the graphic corresponds to the percentage of completion of the scanning task. NAA images being projected by projectors 32 may also change color or brightness (blinking) to communicate or highlight changes or other information.

FIGS. 3-7 illustrate various examples of different applications of NAA images. FIG. 3 illustrates the projection of NAA images 100, 102, 103 and 104 onto a surface. In the example illustrated, the NAA images are illustrated as being projected onto label 22. In other embodiments, the NAA images may be projected upon surface 24 outside label 22 or other surfaces.

NAA image 100 comprises a question, schematically represented. The exact wording of the question is not provided as the question may comprise virtually any question for which a response is requested. In one embodiment, the question may be in the form of a question and may be answered with a yes or a no (or other affirmative or negative responses). As further shown by FIG. 3, in one embodiment, label 22 may be configured to facilitate entry of responses by a person using label 22. In the example illustrated, label 22 includes target 58H providing an affirmative response selection and target 58I providing a negative response selection.

A person may answer the question 100 by centering alignment assist image 51B upon one of targets 28H or 28I and initiating the capture by sensors 34. Alternatively, the person may answer or respond to the question 100 by positioning alignment assist image 50B about one of targets 28H or 28I and initiating the capture by sensors 34. In other embodiments, other response choices may be provided as targets on label 22 for selection by a person when responding to a NAA image 100 presenting a question. Once either of targets 28H or 28I has been captured by sensors 34, controller 40 analyzes the captured image, such as by using optical character recognition, to identify the response and to proceed based upon the response. (One could use control button to scroll down menu for example.) As a result, NAA image 100 and label 22 facilitate input of information or selections to system 20 by a person without the person having to type in a response. Rather, the person merely repositions either sensors 34 (shown in FIG. 1) or label 22 such that the field-of-vision of system 20 contains a selected response. In other embodiments, a response to the question posed by NAA image 100 may be entered using a microphone and speech recognition software, a touch pad, a touch screen, a key board, a mouse or other input devices such as trigger button. (Trigger first position—present display, second position, activate scan. Released position "ready"—may or may not project in this mode.)

NAA image 102 comprises a projected image of text or graphics requesting that the person input authorization for use of system 20 or for accessing external servers or databases that communicate with system 20 via interface 38. Such input may be in the form of a username, a password, a code, a pin or other authorization information. In particular embodiment, label 22 may include an array of numeral targets (0-9) that a person may sequentially locate and align the field-of-vision of sensors 34 over using alignment assist images 50B or 51B to sequentially capture a series of numbers or digits of the authorization code or number in a fashion similar to the input of them an affirmative or negative response as discussed above. In other embodiments, the code or other authorization data may be entered using user interface 36 (shown in FIG. 1).

NAA image 103 comprise a projected image of alphanumeric symbols, text or graphics requesting user to input configuration settings or requesting the user to choose among options for configuring system 20. Examples of configuration settings that may be chosen or input include, but are not limited to, scan speed, scan delay, scan color, audible notes on/off.

NAA image 104 comprises a projected display of instructions advising a person using system 20 how to operate system 20. In other embodiments, such instructions may identify particular targets to be captured or the order at which such targets are to be captured. In other embodiment, the projected display may provide an operator with a "practice sessions" mode without sending data to system or decode and send to system (ie. OFF LINE—allows for training without counting false scanning).

Figure 4:
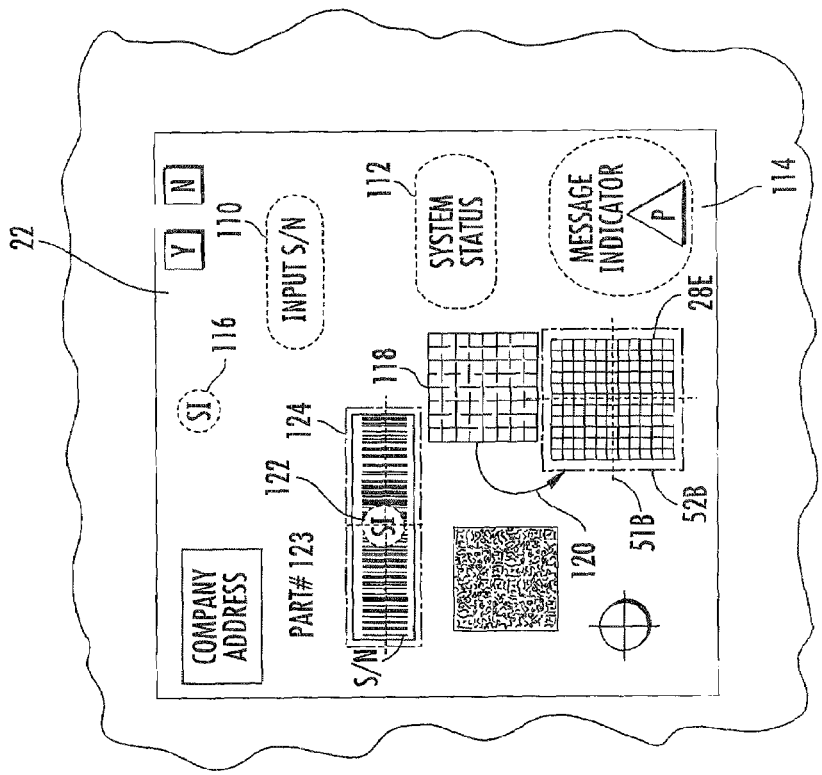
FIG. 4 is a schematic illustration of another set of alignment assist images and non-alignment assist images projected onto the surface according to an example embodiment.

FIG. 4 illustrates the projection of NAA images 110, 112, 114, 116 and 118 onto a surface. In the example illustrated, the NAA images are illustrated as being projected onto label 22. In other embodiments, the NAA images may be projected upon surface 24 outside label 22 or other surfaces. NAA image 110 is an example of a target type request. In particular, NAA image requests the user to scan in a serial number target on label 22. In other embodiments, other types of targets may be requested.

NAA image 112 comprises a projected image of text or graphics informing the person of the status of system 20. The status may include error messages, low battery or low-power states, or a need for replacement or refilling of consumables that may be associated with system 20. For example, in embodiments where system 20 additionally includes a printing device, a system status may relate to whether the printing device is ready for printing or to the need to refill a print media or printing materials such as ink, toner, and the like.

NAA image 114 comprises a projected image providing information to a person regarding a message indicator. Examples of such a message indication include, but are not limited to, a notification that an external communication has been received via communication interface 38 or that a message has been sent or is awaiting to be sent. NAA image 114 may also provide other messages such as the current time and date or reminders regarding task to be completed, meetings to be attended or communications to be made.

NAA image 116 comprises a projected image of one or more source identifiers. For example, image 116 may comprise a logo, trademark and other graphic identifying the source or supplier of system 20, the company or other entity employing systems 20, the company or other entity that owns systems 20 or other entities or sources relating to information on the label 22 or articles or products associated with label 22. In embodiments where the source identifier identifies ownership of system 20, NAA image 116 may reduce the likelihood of theft of system 20 or unauthorized use of system 20.

NAA image 118 comprises a projected image of a graphic simulating or representing the target to be captured. In circumstances where label 22 may include multiple types of bar codes or product codes which may or may not be labeled, the projection of image 118 enables a person using system 20 to quickly and easily identify the target upon label 22 to be captured. As a result, the person using system 20 may quickly and easily locate alignment assist image 51B and the associated field-of-vision 52B over or about the actual target 28 on label 22 which is similar to the projected image 118. Thus, image 118 reduces the likelihood that an incorrect target will be captured by sensors 34.

As further shown by FIG. 4, the alignment assist images may, in some embodiments, be configured to communicate additional information unrelated to demarcating or identifying the field-of-vision of sensors 34 at the present relative positioning of system 20 and label 22. For example, instead of using alignment assist image 50B (shown in FIG. 1) or alignment assist image 51B, controller 40 (shown in FIG. 1) may alternatively generate control signals directing projectors 32 to project a single image, such as image 118 which also has a predetermined or known position (stored a memory 40) relative to the perimeter or area of the field-of-vision of sensors 34. As noted above, image 118 represents or simulates (is visually similar to) the desired target 28 be captured. Thus, not only does image 118 identify to a person the desired target to be captured, but also serves as an alignment assist image. As indicated by arrow 120, the person simply matches up the projected image 118 over the particular target 28 which has a similar appearance to align the field-of-vision 52B with the particular target 28.

FIG. 4 also illustrates another example of an alignment assist image 122. Alignment assist image 122 demarcates or identifies a central or substantially center location for a field-of-vision 124 for sensors 34. In this sense, alignment assist image 122 serves in a fashion similar to a pair of crosshairs. However, alignment assist image 122 also communicates additional information unrelated to the demarcation of the field-of-vision 124. In the particular example illustrated, image 122 serves as a source identifier similar to the NAA image 116 described above. In other embodiments, align assist image 122 may communicate other information to the user, wherein such information is also unrelated to the demarcation of the field-of-vision 124.

Figure 5:
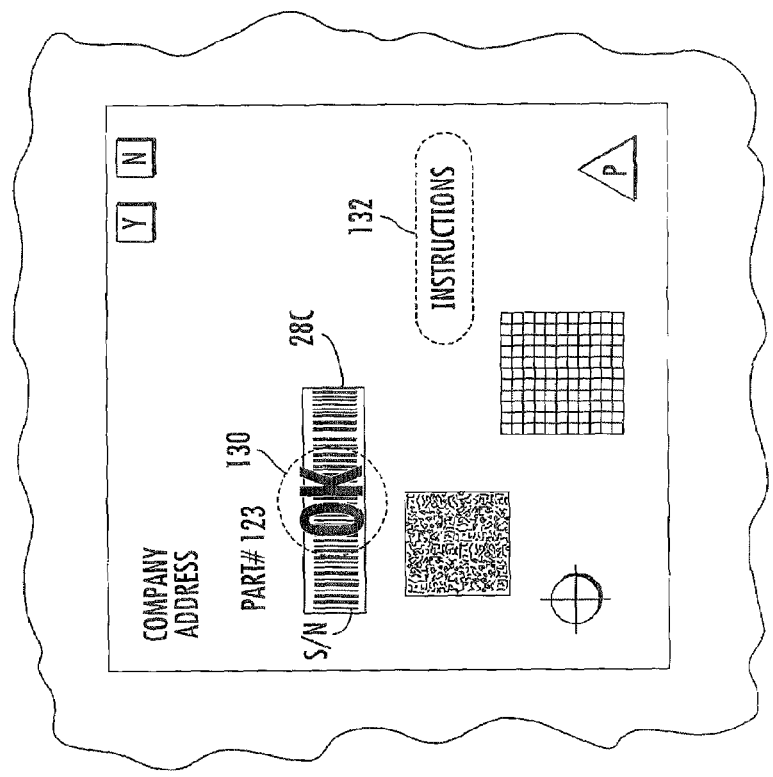
FIG. 5 is a schematic illustration of another set of alignment assist images and non-alignment assist images projected onto the surface according to an example embodiment.

FIG. 5 illustrates the projection of NAA images 130 and 132 onto a surface. In the example illustrated, the NAA images are illustrated as being projected onto label 22. In other embodiments, the NAA images may be projected upon surface 24 outside label 22 or other surfaces. As shown by FIG. 5, unlike NAA images 110 or 118, NAA images 131 and 132 are projected onto a surface after, not before, the capturing of data or an image by sensors 34. NAA image 130 provides to a person a scan status. In the example illustrated, image 130 indicates to the person that the scan has been correctly completed. In other embodiments, if an error occurred during the scan, such an indication may be made by image 130. In the particular example illustrated, NAA image 130 is additionally projected upon the target 28C for which the recent scan was completed. In this manner, a person can confirm what particular target 28 was previously scanned. In some embodiments, if an error occurs, additional NAA images may be projected to aid the training the user or help correct the scanning problem. This can be set to occur after X number of sequential errors. In other embodiments, image 130 may alternatively be projected at other locations upon a surface, whether on or off label 22.

NAA image 132 comprises a projected image of text or graphics providing the person with further instructions after a particular target has been scanned or captured by sensors 34. Such instructions provided by image 132 may identify the next target to be captured, may identify a new product or labels to be scanned or may provide instructions for shutting down system 20. In other embodiments, other instructions may be provided.

Figures 6, 8:
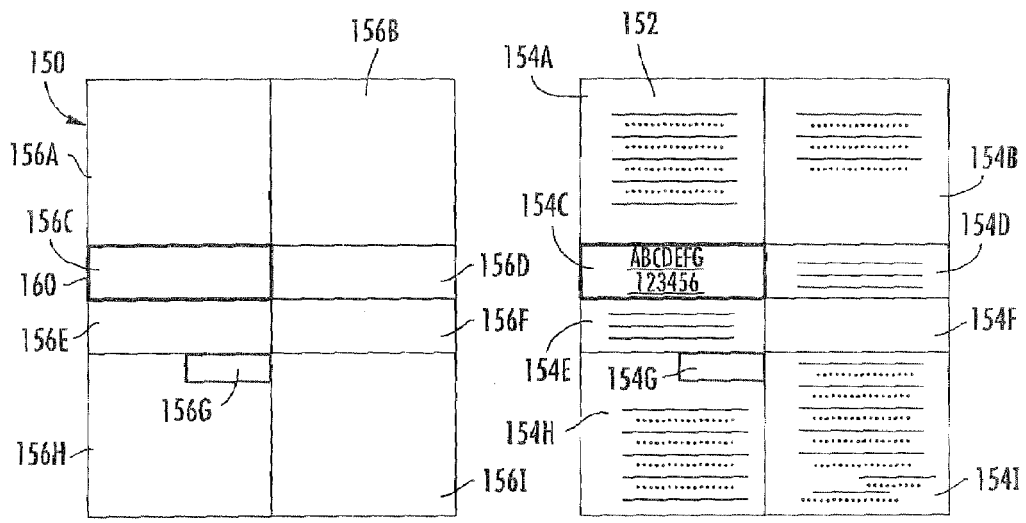
FIG. 6 is a top plan view of a form representation including an alignment assist image portion and non-alignment assist image portions according to an example embodiment.
FIG. 8 is a top plan view of an electronic form corresponding to the image of FIG. 6 according to an example embodiment.

FIG. 6 illustrates projected image 150. Image 150 comprises a representation, simulation or outline of a matrix or form to be at least partially filled or completed based upon or using data from targets, such as targets 28, to be scanned. In a particular example illustrated, image 150 corresponds to the electronic form 152 shown in FIG. 8. As shown by FIG. 6, image 150 has a general outline of form 152. Form 152 may comprise an electronic form stored in memory 44 (shown in FIG. 1) or stored in another memory internal or external to system 20. As shown by FIG. 8, form 152 includes a multitude of cells 154A-154I (collectively referred to as cells 154) to be filled in with data or information. Likewise, image 150 includes cells 156A-156I (collectively referred to as cells 156) which corresponds to cells 154 in location and proportion. According to one embodiment, the entire image 150 may comprise a NAA image which is projected so as to communicate to a person the electronic form which is being filled out by data obtained by scanning targets from label 222. In such an embodiment, distinct alignment assist images, such as alignment images 50A, 51A, 50B or 51B, may also be projected by projectors 32.

In the particular embodiment illustrated, however, image 150 includes both alignment assist image portions and non-alignment assist image portions to facilitate interactive form filling. As shown by FIG. 6, image 150 includes a highlighting or emphasis 160 of a particular cell, cell 156C. In one embodiment, emphasis 160 is formed by increasing a thickness of the border of cell 156C. In another embodiment, the boundaries of cell 156 (part of the projected image of 150) may be made a different color, a different line type, thickness or maybe blinking. In yet other moments, other forms of emphasis 160 may be employed. The emphasized cell 156C serves as an alignment assist image in that its shape, size or location identifies or demarcates a field-of-vision of sensors 34 (shown in FIG. 1). For example, the outer boundaries of cell 156 may comprise the outer perimeter of the field-of-vision of sensors 34. Alternatively, an approximate center of the box or rectangle forming cell 156 may approximate a center of the field-of-vision of sensors 34. Where cell 156 approximates a center of the field-of-vision rather than surrounding or defining a perimeter of the field-of-vision, a person may position the field-of-vision of sensors 34 over a particular target by locating the center of cell 156 over the desired target.

At the same time, the remaining unemphasized cells 156 of projected image 150 comprise NAA images in that their size, shape and location does not demarcate the field-of-vision of sensors 34 to the person. Rather, their size, shape and location relative to the emphasized cell 136 and the user's familiarity with the electronic form 152 being at least partially completed communicate to a person what particular target upon a label should be located within the field-of-vision of sensors 34 for capture by sensors 34.

Figure 7:
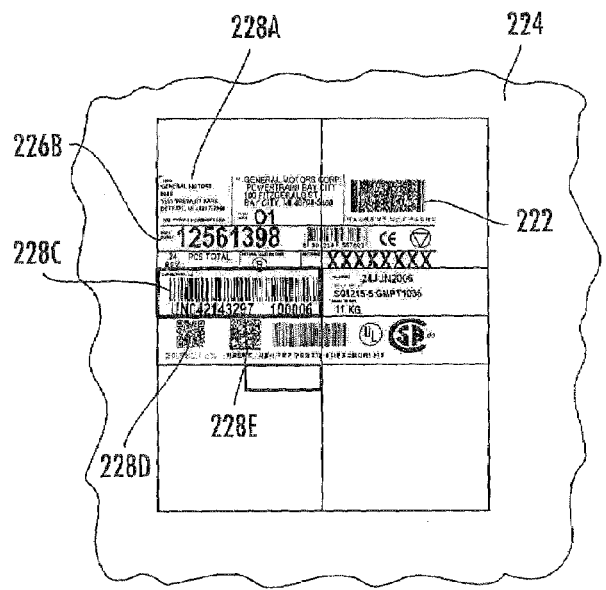
FIG. 7 is schematically illustrating the image of FIG. 6 projected onto a surface according to an example embodiment.

FIG. 7 illustrates image 150 being projected by projectors 32 (shown in FIG. 1) onto a surface 224 including a label 222. As with label 22, label 222 includes a multitude of distinct targets 228, such as targets 228A-228E. Being familiar with the electronic form being completed, the person using system 20 understands that the emphasized cell 156C calls for insertion of particular data from label 222, such as, for example, a serial number. Given this knowledge, as shown in FIG. 7, the person repositions sensors 34 on label 222 such that the alignment assist image provided by the emphasized cell 156C is properly positioned about or over target 228C which provides the serial number data. After capture of target 228 by sensors 34, controller 40 (shown in FIG. 1) (1) analyzes the data by potentially decoding the captured target and (2) inserts the potentially decode information or unaltered information obtained from the captured image of target 228C into cell 154C in form 152 as shown in FIG. 8.

Thereafter, controller 40 may generate control signals directing projectors 32 to emphasize another cell 156 of the image 150 being projected. The position at which image 150 is projected is altered such that a new emphasized cell 156 now corresponds to and demarcates the field-of-vision of sensors 34 for the subsequent image capture. Thereafter, the process is repeated using this new emphasized cell for locating a different target within the field-of-vision and for inserting data from the captured target in a different cell of form 152.

In particular embodiments, controller 40 may generate control signals directing projectors 32 (shown in FIG. 1) to project additional NAA images further aiding a person in properly positioning the emphasized cell 156 of image 150 relative to label 222 to capture a desired target 228 for a particular cell 154 of electronic form 152. For example, projectors 32 may additionally project NAA images such as a target type request such as a projection of text requesting that the serial number be captured. In one embodiment the text "insert serial number" may actually be projected within the emphasized cell. In yet another embodiment, projectors 32 may project a graphical representation of the particular desired target 228 to be placed within the emphasized cell (the field-of-vision of sensors 34). For example, projectors 32 may project a generic product code or barcode image or representation corresponding to a particular type of product footer barcode target in label 222. In one embodiment, the target representation may be projected within the emphasized cell.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
at least one sensor configured to sense electromagnetic radiation reflected from a surface;
at least one projector configured to project electromagnetic radiation onto the surface or another surface; and
a controller configured to generate control signals so as to direct the at least one projector and the at least one sensor to operate in modes including:
the at least one projector projecting an alignment assist image to facilitate alignment of a field-of-vision of the least one sensor with one or more targets on the surface, wherein the controller identifies and analyzes a portion of an image captured by the least one sensor corresponding to a target based upon positioning of the alignment assist image on the surface while disregarding other portions of the image; and
the at least one projector projecting a non-alignment assist image, wherein the non-alignment assist image is selected from a group of images consisting of: a target type request; an input request; a scanned target representation; a question; and a representation of a form to be filled based upon scanned targets existing on a surface to be scanned prior to the projection of the non-alignment assist image.

2. The apparatus of claim 1, wherein the non-alignment assist image comprises one or more alphanumeric symbols or characters.

3. The apparatus of claim 1, wherein the non-alignment assist image comprises a representation of a form to be completed using scanned targets existing on a surface prior to the projecting of the non-alignment assist image, wherein the scanned targets existing on the surface prior to the projecting of the non-alignment assist image have a first layout on the surface and wherein data locations of the form to be completed based upon a scanned targets have a second layout different than the first layout.

4. The apparatus of claim 3, wherein the representation of the form has a first area and wherein the at least one projector is configured to indicate a second area of the representation of the form to be located over a scanned target, wherein the second area is smaller than and contained within the first area.

5. The apparatus of claim 1, wherein the controller is configured to sequentially analyze a plurality of distinct portions of the image captured by the at least one sensor corresponding to distinct targets based upon positioning of the alignment assist image on the surface.

6. The apparatus of claim 1, wherein the controller is configured to configure itself based at least in part upon an image captured by the at least one sensor.

7. The apparatus of claim 1, wherein the at least one sensor comprises a two dimensional array of electromagnetic radiation detectors.

8. The apparatus of claim 1, wherein the controller is configured to generate control signals directing the at least one sensor to capture an image of reflected electromagnetic radiation from the surface including at least one of the nonalignment assist image and the alignment assist image.

9. The apparatus of claim 1, wherein the at least one projector comprises:

a first projector configured to project electromagnetic radiation to form at least one of the alignment assist image and the non-alignment assist image; and
a second projector configured to project electromagnetic radiation at the surface that is reflected and sensed by the least one sensor.

10. The apparatus of claim 1, wherein the alignment assist image is configured to convey non-alignment information to a user.

11. The apparatus of claim 1, wherein the alignment assist image comprises one or more alphanumeric symbols or characters.

12. A method comprising:
projecting a non-alignment assist image onto a surface with a scanning device; and
operating the scanning device based upon the projected non-alignment assist image, wherein the non-alignment assist image is a representation of an electronic form to be filled based upon scanned targets and wherein the method further comprises:
positioning an area of the representation of the electronic form over a target on the surface;
capturing an image of the target, and
storing data based upon the captured image of the target in an area of the electronic form corresponding to the area of the representation of the electronic form;
wherein the representation of the electronic form being projected has a first area and wherein the method further comprises projecting an indication of a second area of the representation of the form to be located over a target to be scanned, wherein the second area is smaller and contained within the first area.

13. The apparatus of claim 1, wherein the one or more targets are different than the portion of the image analyzed.

14. The method of claim 12, wherein the scanned targets have a first layout on the surface and wherein the form to be completed using scanned targets has a second layout different than the first layout.

15. A method comprising:
projecting a non-alignment assist image onto a surface with a scanning device; and
operating the scanning device based upon the projected non-alignment assist image, wherein the non-alignment assist image comprises a representation of a form to be completed using scanned targets;
wherein the representation of the electronic form being projected has a first area and wherein the method further comprises projecting an indication of a second area of the representation of the form to be located over a target to be scanned, wherein the second area is smaller than and contained within the first area.

16. A method comprising:
projecting a non-alignment assist image onto a surface with a scanning device; and
operating the scanning device having a field of vision and based upon the projected non-alignment assist image, wherein the non-alignment assist image is an input request and wherein the method further comprises inputting a response in response to the input request, wherein inputting the response comprises locating an alignment assist image, having a predetermined position relationship to the field of vision on a target, wherein the input response corresponds to the target over which the alignment assist image was located during scanning.

17. The apparatus of claim 1, wherein the scanned targets have a first layout and wherein the form to be completed based upon the scanned targets has a second layout different than the first layout.

18. The method of claim 15, wherein the form to be completed using scanned targets includes a plurality of data locations, each data location to be filled based upon a different one of the scanned targets, and wherein the representation of the form includes a distinct representation for each of the plurality of data locations.

* * * * *

UNITED STATES PATENT AND TRADEMARK OFFICE
CERTIFICATE OF CORRECTION

| | |
|---|---|
| PATENT NO. | : 8,016,198 B2 |
| APPLICATION NO. | : 11/869744 |
| DATED | : September 13, 2011 |
| INVENTOR(S) | : Gregory J. May |

Page 1 of 1

It is certified that error appears in the above-identified patent and that said Letters Patent is hereby corrected as shown below:

Column 15, line 19, in Claim 1, delete "least" and insert -- at least --, therefor.

Column 15, line 21, in Claim 1, delete "least" and insert -- at least --, therefor.

Column 15, lines 64-65, in Claim 8, delete "nonalignment" and insert -- non-alignment --, therefor.

Column 16, line 6, in Claim 9, delete "least" and insert -- at least --, therefor.

Column 16, line 24, in Claim 12, delete "target." and insert -- target; --, therefor.

Column 16, line 65, in Claim 16, delete "vision" and insert -- vision, --, therefor.

Signed and Sealed this
Twenty-eighth Day of August, 2012

David J. Kappos
*Director of the United States Patent and Trademark Office*